United States Patent
Zhang et al.

(10) Patent No.: US 12,392,014 B2
(45) Date of Patent: Aug. 19, 2025

(54) LOW-COST SELECTIVE PRECIPITATION CIRCUIT FOR RECOVERY OF RARE EARTH ELEMENTS FROM ACID LEACHATE OF COAL WASTE

(71) Applicant: University of Kentucky Research Foundation, Lexington, KY (US)

(72) Inventors: Wencai Zhang, Lexington, KY (US); Rick Q. Honaker, Lexington, KY (US)

(73) Assignee: University of Kentucky Research Foundation, Lexington, KY (US)

(*) Notice: Subject to any disclaimer, the term of this patent is extended or adjusted under 35 U.S.C. 154(b) by 1015 days.

(21) Appl. No.: 17/470,690

(22) Filed: Sep. 9, 2021

(65) Prior Publication Data

US 2022/0064759 A1 Mar. 3, 2022

Related U.S. Application Data

(63) Continuation of application No. 16/185,120, filed on Nov. 9, 2018, now Pat. No. 11,155,897.

(60) Provisional application No. 62/583,644, filed on Nov. 9, 2017.

(51) Int. Cl.
| | | |
|---|---|---|
| *C22B 59/00* | (2006.01) | |
| *C22B 3/22* | (2006.01) | |
| *C22B 3/44* | (2006.01) | |

(52) U.S. Cl.
CPC ............... *C22B 59/00* (2013.01); *C22B 3/22* (2013.01); *C22B 3/44* (2013.01)

(58) Field of Classification Search
CPC .. C22B 59/00; C22B 3/22; C22B 3/44; C22B 3/04; C22B 3/06; C22B 3/065; C22B 3/08; C22B 3/10
See application file for complete search history.

(56) References Cited

U.S. PATENT DOCUMENTS

| | | | |
|---|---|---|---|
| 3,054,655 | A | 9/1962 | Pawel et al. |
| 3,110,556 | A | 11/1963 | Peppard et al. |
| 3,455,646 | A | 7/1969 | Morton et al. |
| 3,615,170 | A | 10/1971 | Hazen et al. |
| 3,615,173 | A | 10/1971 | Winget et al. |
| 3,640,678 | A | 2/1972 | Trimble et al. |
| 3,658,486 | A | 4/1972 | Goto et al. |
| 4,255,394 | A | 3/1981 | Helgorsky et al. |

(Continued)

FOREIGN PATENT DOCUMENTS

| | | |
|---|---|---|
| CN | 101161834 A | 4/2008 |
| CN | 103509943 A | 1/2014 |

(Continued)

OTHER PUBLICATIONS

CN101161834 English Machine translation.

(Continued)

*Primary Examiner* — Ricardo D Morales
(74) *Attorney, Agent, or Firm* — Stites & Harbison PLLC; Warren D. Schickli

(57) ABSTRACT

The present invention concerns a process of selective precipitation for the purpose of recovering rare earth elements from acidic media derived from coal and coal byproducts via two main steps of sequential precipitation and selective precipitation. An intermediary step of re-precipitation can be included to further increase RRE concentrations, as well as improve contaminant metal removal.

20 Claims, 10 Drawing Sheets

(56) References Cited

U.S. PATENT DOCUMENTS

| | | | |
|---|---|---|---|
| 4,290,777 A | 9/1981 | Czenkusch | |
| 4,816,233 A | 3/1989 | Rourke et al. | |
| 4,988,487 A | 1/1991 | Lai et al. | |
| 5,129,945 A | 7/1992 | Lyman et al. | |
| 5,518,703 A | 5/1996 | Dissaux et al. | |
| 5,651,947 A | 7/1997 | Collins | |
| 5,770,170 A | 6/1998 | Collins | |
| 6,214,302 B1 | 4/2001 | Malybaeva | |
| 8,968,688 B2 | 3/2015 | Joshi et al. | |
| 8,986,425 B2 | 3/2015 | Sun et al. | |
| 9,115,419 B2 | 8/2015 | Lakshmanan et al. | |
| 9,228,248 B2 | 1/2016 | Sugita et al. | |
| 9,334,549 B2 | 5/2016 | Manepalli et al. | |
| 9,382,600 B2 | 7/2016 | Boudreault et al. | |
| 9,783,870 B2 | 10/2017 | Vaisanen et al. | |
| 9,869,005 B2 | 1/2018 | Berry et al. | |
| 10,030,286 B1 | 7/2018 | Xu et al. | |
| 10,041,147 B2 | 8/2018 | Abramov et al. | |
| 10,697,042 B2 | 6/2020 | Wyrsta | |
| 2012/0156116 A1 | 6/2012 | Gao | |
| 2013/0287653 A1 | 10/2013 | Joshi | |
| 2014/0186239 A1 | 7/2014 | Hoshi | |
| 2015/0307965 A1 | 10/2015 | Boudreault | |
| 2016/0032419 A1 | 2/2016 | Vincec | |
| 2017/0204499 A1* | 7/2017 | Dreisinger | C22B 1/00 |
| 2017/0260606 A1 | 9/2017 | Kasaini | |
| 2017/0356067 A1 | 12/2017 | Peterson et al. | |
| 2018/0265948 A1 | 9/2018 | Laudal | |
| 2018/0363098 A1 | 12/2018 | Huang | |

FOREIGN PATENT DOCUMENTS

| | | |
|---|---|---|
| JP | H09291320 | 11/1997 |
| JP | H11100622 | 4/1999 |
| WO | WO2014020626 A1 | 2/2014 |
| WO | WO2015155386 A1 | 10/2015 |
| WO | WO2017143007 A1 | 8/2017 |
| WO | WO2017146219 A1 | 8/2017 |

OTHER PUBLICATIONS

CN103509943 English Machine translation.
WO2015155386 English Machine translation.
WO2017146219 English Machine translation.
JPH09291320 English Machine translation.
JPH11100622 English Machine translation.

* cited by examiner

LOW-COST SELECTIVE PRECIPITATION CIRCUIT FOR RECOVERY OF RARE EARTH ELEMENTS FROM ACID LEACHATE OF COAL WASTE

RELATED APPLICATIONS

This application is a continuation of U.S. application Ser. No. 16/185,120, filed Nov. 9, 2018, which claims priority to U.S. Provisional Patent Application 62/583,644, filed Nov. 9, 2017, all of which is hereby incorporated by reference in its entirety.

GOVERNMENT SUPPORT

The present invention was made with support from the US Department of Energy under grant DE-FE0027035. The Government may have certain rights to the invention.

FIELD OF THE INVENTION

The present invention relates to a process of selective precipitation for the purpose of recovering rare earth elements from acidic media derived from coal and coal byproducts.

BACKGROUND

Rare earth elements (REEs) were found to be leached out from coal coarse refuse piles under the effects of acids generated through pyrite oxidization which occurred naturally. The ratio of critical to uncritical REEs of the leachate can be as high as 2.0 which is significantly higher than the coarse refuse (about 0.25). The terms "rare earths" and "rare earth elements" as used herein include scandium and yttrium, as well as those elements having atomic number from 57 to 71 inclusively.

That rare earth elements occur in coal and coal byproducts is widely known and has been a topic of historic and ongoing research as shown by Seredin, V. V., & Dai, S. (Coal deposits as potential alternative sources for lanthanides and yttrium. International Journal of Coal Geology, 94, 67-93, 2012) and Honaker et al. (Process evaluation and flowsheet development for the recovery of rare earth elements from coal and associated byproducts. Minerals & Metallurgical Processing, 34(3), 107-115, 2017).

However, it is not commonly known that, due to the nature and attributes of coal and coal byproducts, natural and synthetic leachates can and are formed containing rare earth elements. These leachates may be processed in such a way as to increase the concentration of rare earth elements as insoluble precipitates.

A review of prior art shows that upgrading of rare earth elements via precipitation is not novel. Kaneyoshi et al. 5,545,386 describe a method of producing rare earth elements via pH manipulation to produce a precipitate that is treated with heat to produce an oxide. This work assumes that the rare earth elements were initially water soluble. The solution is then mixed with an alkaline solution to precipitate hydroxides. The precipitate is then separated from the aqueous medium and calcined to produce an oxide.

Further, Fulford et al. 5,015,447 describe a sulfuric based aqueous rare earth solution. This invention covers the utilization of solvent extraction techniques to upgrade rare earth elements by concentration via extractants specified in the organic phase. The rare earth elements are then extracted from the organic phase with increased purity and concentration. The operation of the organic extraction is achieved through pH manipulation.

SUMMARY OF THE INVENTION

The present invention describes a process of manipulating the pH of an acidic liquid containing earth elements in such a way as to selectively precipitate rare earth elements from therein, thus separating the rare earths from contaminants which may be contained in the acidic liquid. The acidic liquid may be generated naturally via acidification of coal and coal byproducts by the oxidation of contained pyrite and by contact with rain or ground water. Natural sources include all sources of sufficient acidity as to contain rare earth elements from coal mining derived sources. In addition, synthetic solutions may be obtained from leaching under controlled processing. These may include but are not exclusive to tank or heap leaching. Further, in the treatment of acidic waters generated from the storage of coal sources, precipitates produced by pH manipulation by mine operators are created containing rare earth elements. These precipitates may also be considered a feed material, with the material being re-leached to bring the rare earth elements again into solution.

The present invention recovers rare earth elements by three steps: 1) sequential precipitation; 2) re-precipitation (optional); and 3) selective precipitation.

In the sequential step, the rare earth containing solution is pH manipulated via controlled and incremental basic solution addition to precipitate out various contaminative elements. The mode of solution addition and aging time allows for the precipitation of elements of interest. After removal of the contaminative element precipitates, the pH is slowly raised to precipitate rare earth elements.

The re-precipitation step is then used to further dissolve precipitates formed in the sequential precipitation step and treat them in a manner which further removes contamination. Thus, depending on the initial solution, this step is optional. An example of use would be when aluminum concentration in the feed is high.

The final step of selective precipitation is when the intermediate rare earth solution is re-filtered to remove insoluble precipitates followed by conditioning with an oxalic acid solution and then pH adjustment. The rare earth elements are selectively precipitated and recovered by filtration with the exception of scandium which remains in the filtrate. Scandium recovery is achieved and a concentrate produced by treating the filtrate by solvent extraction.

DETAILED DESCRIPTION

Figure 1:
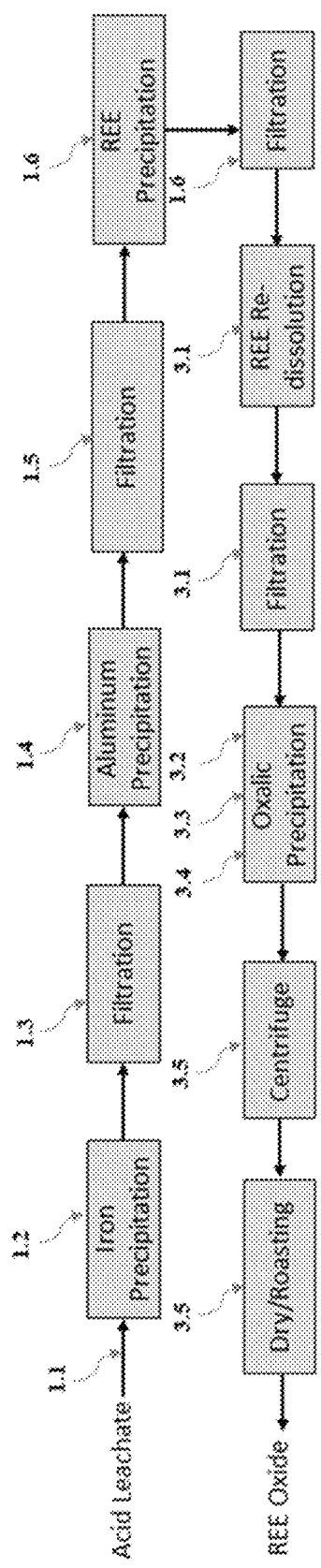
FIG. 1 shows a schematic overview of the steps described in the present invention, configured for feeds exhibiting low aluminum content which includes the obtaining of precipitate 1 by sequential precipitation; and the selective precipitation (precipitate 3). The label numbers correspond to processing steps defined by the embodiment examples.
Figure 2:
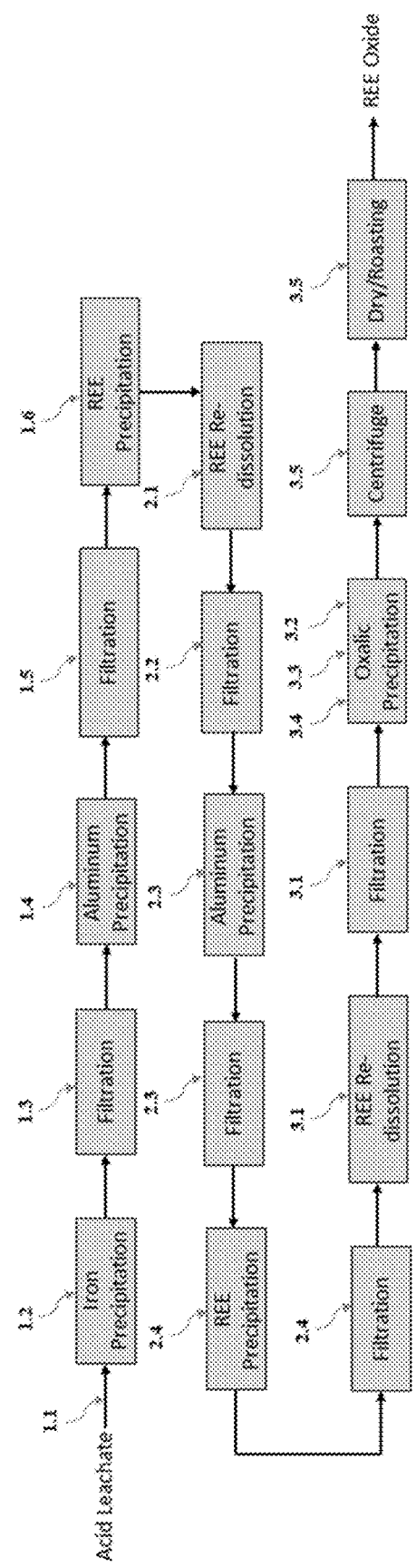
FIG. 2 shows a schematic overview of the steps described in the present invention, including the obtaining of precipitate 1 by sequential precipitation; the optional re-precipitation step to obtain precipitate; and the selective precipitation (precipitate 3) from a re-leached solution in a different acid class (reagent 1). The label numbers correspond to processing steps defined by the embodiment examples.

The present invention relates to a process for enriching rare earth elements within a leachate precipitate. In the process, contaminant metals, such as iron and aluminum, are first sequentially eliminated from the leachate by raising the solution pH values to about 3.5 and 4.5. The exact pH values for a specific leachate are determined by analyzing the concentration changes of iron, aluminum and REEs with increases in solution pH values. Neutralizing reagents such as sodium hydroxide are added in micro increments. After each addition, the solution is stirred for a few minutes to re-dissolve the precipitates which are formed due to inefficient dispersion of the neutralizing reagent. Instead of filtering out the precipitates until the solution pH values reach 3.5 or 4.5, iron and aluminum precipitates are removed as long as measurable amounts are formed. This practice can reduce the loss of REEs to iron and aluminum precipitates due to surface adsorption.

As an overview, precipitates containing about 0.5-1% of REEs are obtained in the pH range about 5.0-9.0 through the sequential precipitation process. The majority of iron is removed while aluminum may still be the dominant contaminant due to its higher precipitation point and higher concentration in some leachate samples. To further reduce the aluminum content, the precipitate is optionally re-dissolved in smaller volume of solution at pH 2.0. For example, precipitates obtained from 10 liters of leachate may be re-dissolved in 1 liter of solution. In this case, aluminum can be removed at lower pH values (e.g., 3.5) due to its increased concentration, while a minimum amount of REEs is lost. The solution that is used to re-dissolve the precipitates can be the residual leachate after the precipitate is filtered out at pH 9.0. It is advisable that the dissolving acid in this step be different than that of the initial step so as to promote additional precipitation selectivity. More efficient removal of aluminum can be obtained by adding inorganic regulators such as $MgCl_2$ or $CaCl_2$) into the solution. The purpose of these is to prevent REEs from co-precipitating or adsorbing on the contaminant precipitates. REEs are re-precipitated from the solution in the pH range 5.0-9.0. It is advisable that the dissolving acid in this step be different than that of the proceeding step so as to promote additional precipitation selectivity.

The REEs-enriched precipitates obtained from the above steps are re-dissolved in smaller volumes of liquid (e.g., 100 ml versus a start leachate volume of 10 liters). It is advisable that the dissolving acid in this step be different than that of the initial step so as to promote additional precipitation selectivity. The REEs concentrations in the liquid are in the range of 0.1-0.2 g/L with major contaminants of Mg, Mn, and Ca. REEs are precipitated out from the liquid using a different class of acid, such as nitric and oxalic acid, in the pH range of 1.0-1.2, which can generate a final rare earth product containing about 70% or higher. The REEs remaining in solution containing primarily scandium can also be further purified using a simple solvent extraction process. The process combines a single stage of loading, scrubbing and stripping. The REEs in the stripping solution are finally precipitated out using oxalic acid in the pH range of 1.0-1.2. Products with more than 90% of rare earth oxides can be obtained using this circuit and produce a concentrated scandium oxide while recovering 80% or more of the REEs.

The process of the invention comprises of the two main steps of sequential precipitation and selective precipitation. An intermediary step of re-precipitation can further increase RRE concentrations, as well as improve contaminant metal removal.

For the first step of sequential precipitation, a leachate or a precipitate obtained from a leachate, is introduced into a solution with an acidic pH value of 2.70 (±0.50 pH units) is placed into a plastic container. The acid used for sequential precipitation is of a different class from that used in selective precipitation. The liquid may be stirred or agitated therein, such as through the use of a magnetic stirrer to ensure complete dispersion. A base solution, such as sodium hydroxide or other suitable base of compatible type and concentration, may then be added incrementally, e.g. dropwise, to raise the pH. It is of benefit to continue stirring or agitation to allow for thorough dispersion so that precipitates formed due to base solution concentration gradients are re-dissolved back into the solution.

With the step-wise increase in the solution pH value, precipitates of iron (III) first appear at around pH 3.20 (±0.20 pH units depending on the ferric iron concentration) and the majority of the iron is removed at around pH 3.80 (±0.20 pH units). The iron precipitates are then filtered out of solution.

Following iron filtration, additional base is added using the same procedure, to provide for a gradual increase in the solution pH value to around 4.80 (±0.20 pH units). At this point, about 85% of the aluminum may now be removed from the liquid as a precipitate. The aluminum precipitates may then be also removed from the solution. The remaining filtrate may then serve as a feed solution for the subsequent REE pre-concentration step.

To obtain a REE pre-concentrate, base is added to the remaining filtrate using the same procedure to elevate the solution pH to about 8.50 (±0.50 pH units). By increasing solution pH from 4.80 to 8.50, more than 90% of REEs are precipitated from the solution. The total REEs content of the precipitate is typically more than 1% on a dry, whole mass basis. The filtrate may then be stored for subsequent REE concentration steps.

For further upgrading purposes, the rare earth pre-concentrate is either processed using the following procedures of re-precipitation or directly treated by the selective precipitation process.

Re-precipitation allows an additional, optional step to further increase REE concentration, for example, when aluminum concentration in the natural leachate is high (i.e., >500 ppm). The pre-concentrate may be processed by mixing the rare earth pre-concentrate with the filtrate obtained after the REE precipitation. Re-dissolution of the precipitate is achieved by adding an acid solution (5M) (i.e., a different class of acid from that used in sequential precipitation). The acid solution is sequentially added in increments, followed by a certain time period (e.g., 5 minutes) of stirring or agitation until the slurry pH is stabilized. This allows for more than 95% of the REEs to be dissolved back into solution when the pH value is decreased to 2.0 (±0.50 pH units). A small amount of manganese-rich precipitate cannot be dissolved and may be then filtered out.

To remove further aluminum from the filtrate, the solution pH is increased to about pH 4.00 (±0.10 pH units) using a basic solution and the same incremental adding procedure previously described. Calcium chloride or magnesium chloride may optionally be added into the filtrate before raising the pH value to promote the aluminum removal efficiency. The aluminum precipitates are removed by filtration. The solution pH value of the remaining filtrate is increased to about 9.0 (±0.50 pH units) by gradual addition of the basic solution (5 M, step 1.2). In this case, a rare earth pre-concentrate is obtained with a minor amount of contaminants. The pre-concentrate is used as feed material for the final REE concentration step. The total REE content in the precipitate produced in this step is more than 1% by weight.

After these sequential-concentration and/or re-precipitation-concentration processes, rare earth concentrates of more than 90% purity are obtained using the following steps of selective precipitation. Pre-concentrates from the sequential precipitation or from the re-precipitation are dissolved into a smaller volume of the filtrate obtained after precipitation of the REE using the same procedure as initially used for re-precipitation, except with a final pH value of about 1.2. The solution is filtered and the filtrate stored for subsequent tests.

The filtrate is then preferably transferred to a separate container and mixed with an acid of a different class from that utilized in sequential precipitation and/or re-precipitation, such as e.g., an oxalic acid solution. The acid solution is optimally stirred to provide for complete dispersion. The solution pH value of the suspension after stirring is about 0.90 (±0.10 pH units).

A strong base solution (e.g. 10 M) is then added incrementally (e.g. 0.01 ml per 30 seconds) into the solution. After each addition, the solution is stirred to ensure that the base is thoroughly dispersed and the precipitates formed due to base solution concentration gradients are re-dissolved back into solution. The base addition is continued until a solution pH value of about 1.20 (±0.05) pH units is reached.

Stirring may then be maintained for a longer period of time before proceeding further, such as for 20 minutes. Solution pH values of the suspension might deviate slightly from 1.20, in which case base (10 M) or acid (5 M) solution is added in an incremental fashion to maintain the pH value at about 1.20 (±0.05 pH units).

After stirring, the rare earth precipitates are separated from the residual liquid using processes such as centrifugation. The final precipitates may then be dried, after which rare earth oxide products are generated by roasting. Rare earth oxide content of the precipitates is more than 90% and overall rare earth element recovery is more than 80%.

1. EXAMPLES

A. An example of a possible embodiment for small scale recovery as tested on natural leachate samples is as follows:

1.1 Five liter sample of a natural leachate with a solution pH value of 2.70 (±0.50 pH units) is placed into a plastic container. The liquid is stirred using a magnetic stirrer at 400 rpm to ensure complete dispersion.

1.2 0.5 ml (±0.50 ml) of sodium hydroxide solution (5 M) is added in step wise fashion into the leachate to raise the solution pH value. Magnetic stirring is maintained for 1 minute after each 0.5 ml addition to ensure that the base is thoroughly dispersed and precipitates formed due to base solution concentration gradients are re-dissolved back into the solution.

1.3 With the step-wise increase in the solution pH value, precipitates of iron (III) first appear at pH 3.20 (±0.20 pH units depending on the ferric iron concentration) and complete removal of iron occurs at pH 3.80 (±0.20 pH units). The iron precipitates are filtered out of solution using 5 micron (or finer) pore-size filter paper.

1.4 After filtration, additional sodium hydroxide solution (5 M) is added using the same procedure described in Step 1.2 resulting in a gradual increase in the solution pH value to 4.80 (±0.20 pH units). At this point, about 85% of the aluminum is removed from the liquid as a precipitate.

1.5 The aluminum precipitates are removed from the solution by filtering using 5 micron (or smaller) pore-size filter paper. The remaining filtrate serves as a feed solution for the subsequent REE pre-concentration step.

1.6 To obtain a REE pre-concentrate, sodium hydroxide solution (5M) is added to the remaining filtrate using the same procedure described in Step 1.2 to elevate the solution pH to 8.50 (±0.50 pH units). By increasing solution pH from 4.80 to 8.50, more than 90% of REEs are precipitated from the solution. The total REEs content of the precipitate is typically more than 1% on a dry, whole mass basis. The filtrate is stored for subsequent REE concentration steps.

For further upgrading purposes, the rare earth pre-concentrate is either processed using the following procedures or directly treated by the selective precipitation process. When aluminum concentration in the natural leachate is high (i.e., >500 ppm), the pre-concentrate is processed by:

2.1 Rare earth pre-concentrate obtained in Step 1.6 is mixed with 500 ml (depending on the starting volume) of the filtrate obtained in Step 1.6. Re-dissolution of the precipitate is achieved by adding nitric acid solution (5M). The acid solution is sequentially added in increments of 0.5 ml followed by a certain time period (e.g., 5 minutes) of magnetic stirring until the slurry pH is stabilized.

2.2 More than 95% of the REEs is dissolved back into solution when the pH value is decreased to 2.0 (±0.50 pH units). A small amount of manganese-rich precipitate cannot be dissolved and is filtered out using 5 micron (or finer) pore-size filter paper.

2.3 To remove aluminum from the filtrate obtained in step 2.2, the solution pH is increased to pH 4.00 (±0.10 pH units) using 5M sodium hydroxide solution and the same procedure described in step 1.2. Calcium chloride or magnesium chloride is added into the filtrate before raising the pH value to promote the aluminum removal efficiency. The aluminum precipitates are removed using 5 micron (or finer) pore-size filter paper.

2.4 The solution pH value of the remaining filtrate is increased to 9.0 (±0.50 pH units) by gradual addition of sodium hydroxide solution (5 M, step 1.2). In this case, a rare earth pre-concentrate is obtained with minor amount of contaminants. The pre-concentrate is used as feed material for the final REE concentration step. The total REE content in the precipitate produced in this step is 1.5% to 2.0%. The suspension was filtered using 5 micron (or finer) pore-size filter paper.

After the pre-concentration (Step 1.1-1.6) and/or re-pre-concentration (Step 2.1-2.4) processes, rare earth concentrates of more than 90% purity are obtained using selective precipitation as the final process, which is described as follows:

3.1 Pre-concentrates obtained in step 1.6 and/or step 2.4 are dissolved into the filtrate obtained in step 1.6 using the same procedure as step 2.1 except that the final pH value is 1.2 and the filtrate volume is 100 ml. The solution is filtered using 5 micron (or finer) pore-size filter paper. The filtrate is stored for subsequent tests.

3.2 30 ml of the filtrate is transferred to a beaker having a 50 ml maximum volume. Oxalic acid solution is prepared by dissolving 8 grams of oxalic acid dehydrate powders (>99% purity) in 50 ml of deionized water. Oxalic acid solution of 1.5 ml (optimum amount exists which is a function of rare earth concentration in solution) is added into the beaker. The solution is magnetically stirred for 1 minute at 400 rpm for complete dispersion. The solution pH value of the suspension after stirring is about 0.90 (±0.10 pH units).

3.3 A sodium hydroxide solution (10 M) is added dropwise (0.01 ml) into the solution. After each addition, the solution is magnetically stirred for 30 seconds or longer to ensure that the base is thoroughly dispersed and the precipitates formed due to base solution concentration gradients are re-dissolved back into solution. The base addition is continued until a solution pH value of 1.20 (±0.05) pH units is reached.

3.4 Magnetic stirring is maintained for 20 minutes. Solution pH values of the suspension might deviate slightly from 1.20, in which case sodium hydroxide (10 M) or nitric acid (5 M) solution is added in a dropwise (0.01 ml) fashion to maintain the pH value at 1.20 (±0.05 pH units).

3.5 After stirring, the rare earth precipitates are separated from the residual liquid using a centrifuge. The final precipitates are dried in an oven, after which rare earth oxide products are generated by roasting at 8000° C. (±1000° C.) for 1 hour or longer. Rare earth oxide content of the precipitates is more than 90% and overall rare earth element recovery is more than 80%.

B. Rare Earth Elements Recovery Using Staged Precipitation from a Leachate Generated from Coarse Coal Refuse Rare earth elements (REEs) are a group of 15 lanthanide elements plus scandium and yttrium, which can be divided into heavy REEs (HREEs: Eu, Gd, Tb, Dy, Ho, Er, Tm, Yb, Lu, Y) and light REEs (LREEs: La, Ce, Pr, Nd, and Sm) based on their locations in periodic table and atomic weights (Binnemans et al., 2013; Massari and Ruberti, 2013). The world demand for rare earth elements (REEs) in 2011 was approximately 105,000 tones±15% and grew at a rate between 5% and 9% due to their importance in manufacturing of advanced military and renewable energy technologies as well as many commodity items used by the general public (Alonso et al., 2012; Hatch, 2012). The share of REO demand from wind power, electric vehicles, and NiMH batteries in total clean technologies was expected to increase from 11.6%, 50.1%, and 3.4% in 2016 to 13.4%, 68.5%, and 10.3% in 2030, but the demand for Nd and Dy from these three fields in 2030 will increase to 199.2% and 268.3% of 2016 level (Klossek et al., 2016; Zhou et al., 2017).

Significant studies have been conducted recently to recover REEs from coal and coal related materials to overcome the disadvantages associated with commercial rare earth resources (Ayora et al., 2016; Franus et al., 2015; Honaker et al., 2018; Honaker et al., 2017; Honaker et al., 2016a; Honaker et al., 2016b; Honaker et al., 2014; Kashiwakura et al., 2013; Lange et al., 2017; Lin, et al., 2017; Ponou et al., 2016; Rozelle et al., 2016; Zhang et al., 2018; Zhang et al., 2017; Zhang et al., 2015; Ziemkiewicz et al., 2016). In addition to coal, preparation waste, both coarse and fine, may also be sources of REEs (Glushkov et al., 2016a, 2016b; Vershinina et al., 2016). Coal based materials are normally rich in the highly-valued HREEs due to geochemical interactions (Dai et al., 2016; Hower et al., 1999; Seredin and Dai, 2012).

The humic acids associated with coal during the early stages of coalification preferentially chelate with the HREEs due to the higher stability of their complexes (Eskenazy, 1987; Pourret et al., 2007; Stern et al., 2007; Wang et al., 2008). REEs in coal mainly exist in forms of minerals (either authigenic or detrital), ion-adsorbed and/or ion-substituted, and organic bounded forms (Dai and Finkelman, 2018; Seredin and Dai, 2012). Pure monazite particles with >30% REEs were identified in fine refuse materials collected from a coal preparation plant processing Fire Clay seam coal (Zhang et al., 2017). Based on the mineralogy of the REEs, Honaker et al. (2017) proposed an integrated flowsheet, which combined flotation, hydrophobic-hydrophilic separation (HHS), acid leaching, solvent extraction and selective precipitation, to obtain a final concentrate containing 2% total REEs at a recovery of around 50% from coal middlings and refuse materials.

A survey conducted in 2013 of 20 operating coal preparation plants located in the northern and central Appalachia coalfields found that the total amount of rare earth elements (REEs) contained within the combined feed to all 20 plants was nearly 9900 tons annually (Luttrell et al., 2016). Of the total amount of REEs in the plant feed, 63% or 6285 tons annually existed in the coarse refuse (Honaker et al., 2016a). Honaker et al. (2017) reported that >50% of the REEs associated in waste materials of three different coal seams (i.e., Fire Clay, West Kentucky No. 13 and Lower Kittanning) were recovered using sulfuric acid at pH 0, indicating the feasibility of using tank leaching for recovering REEs. To reduce the cost of the leaching process, an alternative method for recovering REEs from coal refuse is heap leaching utilizing the natural acid generation capabilities of coal refuse that contains medium-to-high amounts of pyrite (Honaker et al., 2018). The potential benefits include long term chemical interactions with low capital and operating costs (Pradhan et al., 2008).

Figure 3:
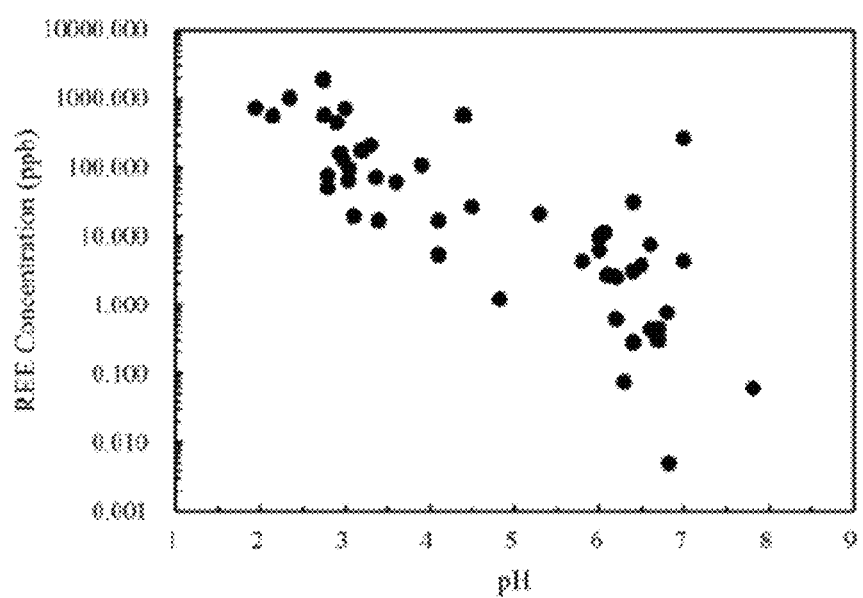
FIG. 3 shows REE concentration in acid mine drainage as a function of solution pH values based on data reported in literature. (The data are from Da Silva et al., 2009; Migaszewski et al., 2016; Sahoo et al., 2012; Stewart et al., 2017; Sun et al., 2012; Worrall and Pearson, 2001a, Worrall and Pearson, 2001b; Zhao et al., 2007; Ziemkiewicz et al., 2016).

Pyrite associated in coal seams can be oxidized into ferric ions in the presence of oxygen and water along with the generation of a proton (H), which explains the appearance of acid mine drainage (AMD). The REEs are dissolved from the solid material due to the exposure to the natural leachate, which presents the opportunity for rare earth recovery using hydrometallurgical techniques such as selective precipitation and solvent extraction (Da Silva et al., 2009; Migaszewski et al., 2016; Sahoo et al., 2012; Stewart et al., 2017; Sun et al., 2012; Worrall and Pearson, 2001a; Worrall and Pearson, 2001b; Zhao et al., 2007; Ziemkiewicz et al., 2016). As shown in FIG. 3, REE concentrations increased exponentially from 0.01 ppb to about 2 ppm with a decrease in the solution pH values from around 8 to 2. A high REE concentrate (e.g., 714 ppm as reported in Ziemkiewicz et al., 2016) was produced in an AMD sludge when using neutralizing agents such as lime to eliminate the negative impacts of AMD on the environment. Studies by Ayora et al. (2016) and Verplanck et al. (2004) concluded that, instead of co-precipitating with ferric ions, REEs in AMD tend to be precipitated at higher pH values (pH>5.1). As such, REE concentration from AMD can be realized by selective precipitation as an alternative to solvent extraction to directly recover the REEs from the very dilute AMD solutions.

A number of studies have been performed previously on metal recovery from acid mine drainages (AMDs) using methods such as precipitation, adsorption, and ion-exchange (Mohan and Chander, 2006; Feng et al., 2000; Wei et al., 2005). Wei et al. (2005) obtained iron and aluminum precipitates with purity>93.4% and 92.1% from an acid mine drainage using selective precipitation. Balintova and Petrilakova (2011) recovered 97.16% Fe, 92.9% Al, 95.23% Cu, 88.72% Zn, and 89.49% Mn from an acidic mine drainage in pH ranges<4.05, 4 5.5, 4.49 6.11, 5.5 7.23, and 5.5 9.98, respectively. The redox potential of the AMD was regulated to control the precipitation behaviors of iron in the solution (Balintova and Petrilakova, 2011; Jenke and Diebold, 1983). Various neutralizing reagents such as sodium hydroxide, sodium carbonate, ammonia, and lime have been tested. Similar results were reported by Wei et al. (2005) for metal recovery. In addition to the above chemicals, other precipitants such as sodium sulfide and phosphoric acid were also utilized to precipitate certain metal ions from AMD. Detailed studies of the technical and economic aspects of rare earth recovery from coal mine drainages is limited (Ayora et al., 2016; Ziemkiewicz et al., 2016).

As previously mentioned, the results in the current study are being used to assist in the design of a heap leach process for recovering rare earth elements. The recovery of REEs and the other valuable elements such as cobalt from AMD using selective concentration method is an important focus of this study, which has received limited attention.

Furthermore, instead of using a single one-step neutralization process for the acid leachate treatment on mine sites, findings of this study provided another approach which also concentrates the associated valuable elements. In the study, a natural leachate sample generated from a coal coarse refuse pile of a preparation plant located in western Kentucky was collected together with the solid sample. The waste water sample was generated through long term interaction of clean water with the coarse refuse, which is similar to the heap leaching process.

Elemental compositions of the collected samples were analyzed to identify the partitioning behavior of REEs in the liquid relative to the coarse refuse. To test the feasibility of REE recovery from the natural leachate, precipitation tests were conducted and precipitates collected in different pH ranges. Solution chemistry characteristics of REEs in the leachate were studied by elemental analyses and equilibrium calculations.

Efficient recovery of REEs from the leachate was finally obtained.

2. MATERIALS AND METHODS

Coarse refuse generated from the processing of West Kentucky No. 13 seam coal was identified as a promising feedstock for recovering REEs in a project funded by the U.S. Department of Energy (Honaker et al., 2016a). Analysis of a representative sample collected from a sweep-belt sampler revealed ash and total sulfur contents of 83.53% and 6.41%, respectively. The origin of the sulfur was primarily from pyrite. Throughput capacity of the coal preparation plant was 1800 tph which produced coarse refuse at a rate of 600 tph. The coarsewaste was transported and stored in a large refuse pile built on top of a four-foot clay liner located near the processing plant. Natural leachate (waste water) was generated from pyrite oxidation under weathering effects at a rate up to approximately 7600 m/day. As required by environmental regulations, the pH value of the natural liquid was elevated using lime prior to discharge. A representative liquid sample was collected from the natural leachate stream at a point located upstream of the lime addition for the purposes of the test program.

Upon delivery of the samples to the laboratory, the coarse refuse solid sample was dried under natural atmospheric conditions before being crushed and ground to finer than 0.15 mm. A representative sample was collected from the pulverized material using cone quartering and a riffle splitter. To analyze its elemental composition, the solid sample was digested using aqua regia and hydrofluoric acid based on the ASTM standard (ASTM D6357 11). The natural leachate sample was filtered using 0.45 m pore size filter papers to remove any suspended particles and the solution pH value measured to be 2.70. Solution pH was measured using a Thermo Scientific Orion Star Pro pH meter with an accuracy of 0.002 pH unit. Metal ion concentration in the solution was analyzed using an inductively coupled plasma optical emission spectrometry (ICP-OES) unit. Ion chromatography (IC) was utilized to measure concentrations of major anions in the natural leachate.

Staged precipitation tests were performed on the natural leachate sample of 2 L using an apparatus consisting of a pH meter, magnetic stirrer and vacuum filter. For each stage of precipitation, the solution pH was gradually increased by adding 2M sodium hydroxide solution.

The pH value was elevated in steps by adding 0.5 ml of the sodium hydroxide solution prior to each stage. The solution pH before the base addition was recorded as the initial pH for this stage of precipitation. To eliminate the potential of localized precipitation due to concentrated basic solution, the leachate sample was stirred for a period of 2 min during and after the base solution addition. The solution pH after 2 min of conditioning was recorded as the final pH for the given precipitation stage. A bulk precipitate was generated due to the pH increase which was recovered by filtration using 0.45 m pore size filter paper. The filtrate was subjected to further pH incremental increases followed by filtration to obtain a series of precipitates in different pH ranges. The precipitates were dried in an oven for 12 h.

Elemental composition of the precipitate was measured using ICPOES after re-dissolution of the precipitate following the ASTM D6357 11 method. For each batch of 50 samples, a standard solid sample supplied by the National Institute of Standards and Technology (NIST) of the U.S. Department of Commerce was digested together with the precipitates. A liquid standard with known REE contents was also analyzed with each batch for quality control of the ICP-OES. Analysis results were accepted if differences between the measured contents and the values provided by the supplier were ±10%. Detection limits of the method developed using the ICP-OES for REE concentration measurements were: Sc (1.77 ppb); Y (3.72 ppb); La (3.28 ppb); Ce (7.65 ppb); Pr (19.13 ppb); Nd (4.51 ppb); Sm (18.25 ppb); Eu (6.87 ppb); Gd (8.24 ppb); Ho (6.32 ppb); Tb (15.04 ppb); Dy (2.30 ppb); Ho (6.32 ppb); Er (2.81 ppb); Tb (15.04 ppb); and Lu (7.49 ppb).

Additionally, a fundamental study of the precipitation process for a solution of REEs and other metal ions was conducted based on the elemental compositions of the precipitates and the natural leachate.

Solution equilibrium calculations were performed using the Visual MINTEQ 3.1 software which was developed by Jon Petter Gustafsson of KTH, Sweden. The software calculated the equilibrium concentrations and activities of all the species in the system. Saturation index (SI) values representing the possible solid phases formed in solution at given pH values were quantified, which was utilized to determine whether the formation of the solid phase was thermodynamically favorable. The solution chemistry study provided a fundamental understanding of the REE recovery process from natural coal refuse leachates using the staged precipitation method.

Finally, to support the findings of the above studies, sequential precipitation tests were performed on three model liquid systems using concentrations of specific elements nearly equal to the natural leachate: liquid 1 (1120 ppm Fe, 1920 ppm SO, 8 ppm La); liquid 2 (540 ppm Al, 1920 ppm SO, 8 ppm La); liquid 3 (560 ppm Fe, 270 ppm Al, 1920 ppm SO, 8 ppm La). The Fe and Al ion concentrations were varied to keep the metal to SO ion concentration ratio constant. All the liquids were prepared by dissolving the required amounts of $FeCl \cdot 6H_2O$, $AlCl \cdot 6H_2O$, $Na_2SO_4$, and $LaCl \cdot 7H_2O$ in deionized water. The chemicals were trace metal grade and purchased from Fisher Scientific. Artificial liquid of 2 L were utilized for the tests. The solution pH was continuously increased by adding sodium hydroxide (2M) and a series of 5 mL supernatants were obtained from the solution at different pH using a syringe filter to remove the precipitates. The percentage of the elements that were removed from the liquid was calculated based on the ICP-OES measurements of the supernatants and the initial liquid composition.

3. RESULTS AND DISCUSSION

3.1. Sample Characterization

Figure 4:
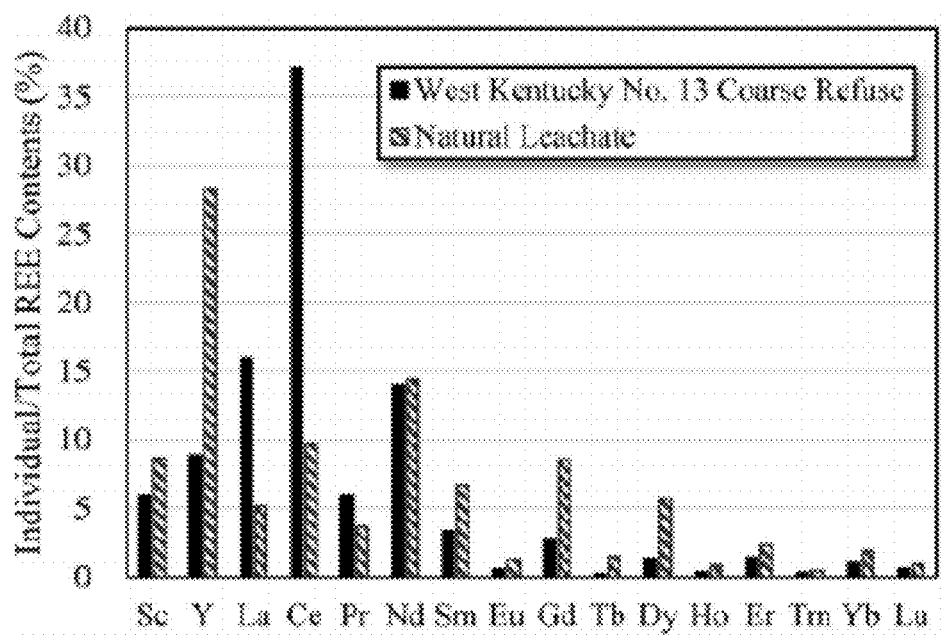
FIG. 4 shows Percentages of individual REEs in the total REEs for both the coarse refuse and natural leachate samples.

Total REE content of the coarse refuse on a dry whole mass basis was 320 ppm (Table 1) which was significantly higher than that of the world coal average (72.37 ppm) and North American Shale Composite (165.4 ppm) (Gromet et al., 1984; Ketris and Yudovich Ya, 2009). The natural leachate contained 6.14 ppm of total REEs which was also much higher than the AMDs at a similar pH value of 2.70 shown in FIG. 3. Ce and La were the major REEs in the coarse refuse sample with an overall percentage of 53% relative to the total REE content. In the natural leachate sample, yttrium (Y), which is one of the critical REEs (i.e., Nd, Eu, Tb, Dy, and Y; the others belong to uncritical; defined by Chu, 2011), was the dominant REE with a proportion of 28% (FIG. 4) of the total REEs. Nearly all of the critical and heavy REEs were concentrated in the natural leachate relative to the coarse refuse. The HREEs/LREEs (H/L) and critical REEs/uncritical REEs (C/UC) ratios of the natural leachate, which were calculated using mass-based concentrations (ppm), were much higher than that of the coarse refuse (H/L: 1.08 vs 0.21; C/UC: 1.05 vs 0.34). As such, natural acid leaching of the coarse refuse via pyrite oxidization selectively transferred the more valuable and critical REEs from the solid into the solution. These results indirectly provided a reason to pursue the economic recovery of the REEs from coal coarse refuse using heap leaching processes which would optimize the production of the natural leachate.

Figure 5:
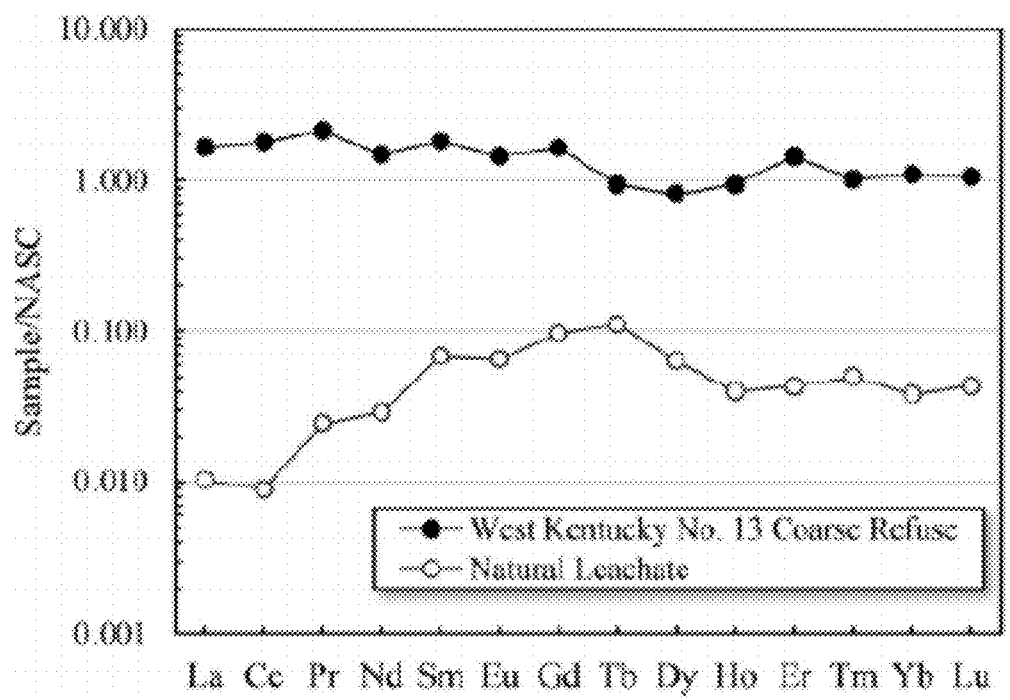
FIG. 5 shows NASC normalized patterns of both the coarse refuse and natural leachate samples of West Kentucky No. 13 seam (rare earth contents of NASC were referred to Gromet et al., 1984).

Previous studies have shown that REEs located in the middle of lanthanide series, i.e., Sm, Eu, Gd, Tb, and Dy, are more likely enriched in the AMD compared to the REE content of the North American Shale Composite (NASC) due to various reasons including: (1) the abundance and distribution of mineral phases containing REEs, (2) the stability of these REE-bearing mineral phases with respect to the aqueous fluids, (3) the chemistry of the aqueous fluids, and (4) the immobilizing capacity of secondary minerals to REEs (Da Silva et al., 2009; Dai et al., 2013; Stewart et al., 2017; Worrall and Pearson, 2001a; Zhao et al., 2007). The REE patterns in the coarse refuse and natural leachate normalized to the NASC are shown in FIG. 5. Sm, Eu, Gd, Tb, and Dy were more concentrated in the natural leachate compared to the other REEs when normalized to the NASC, which is in agreement with the findings reported from previous studies. As such, the natural leachate generated from the coarse refuse pile shares some similar characteristics with AMDs, while the total REE concentration in the leachate was much higher than the AMDs reported in literature (FIG. 3).

3.2. Staged Precipitation

Figure 6:
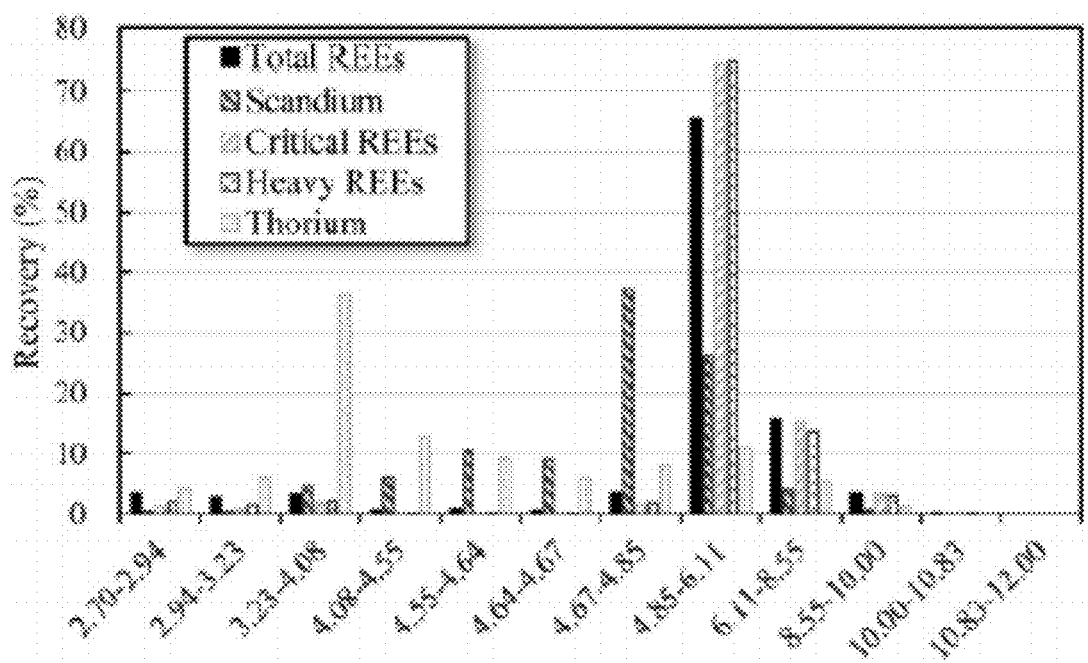
FIG. 6 shows Recovery of total, critical and heavy REEs, scandium, and thorium in the precipitates obtained in different pH ranges (recovery values were calculated on a mass basis and add to 100% for each metal/group).

Precipitation behaviors of REEs as a function of the solution pH values were investigated through staged precipitation tests. REE contents of the precipitates obtained in different pH ranges are shown in Table 2. Thorium contents were also measured for evaluating environmental impacts. A precipitate (P8) with 10,763 ppm (1.08%) of total REEs was obtained in the pH range of 4.85 6.11. H/L and C/UC ratios of the precipitate were 1.54 and 1.51 (Table 3), respectively, indicating selective enrichment of the highly-valued REEs in the sample. In more basic conditions (i.e., pH 6.11 8.55), enrichment of REEs also occurred with an overall concentration of 2968 ppm. FIG. 6 shows the distribution of total REEs, scandium, thorium, heavy REEs and critical REEs in different precipitates calculated based on the rare earth concentration of the natural leachate (Table 2). Both critical and heavy REEs were mostly recovered in the precipitates produced in the pH ranges 4.85 6.11 (74.3% and 74.7%) and 6.11 8.55 (15.4% and 13.5%) with an overall recovery of >85%, indicating the efficiency of REE recovery from the natural leachate through staged precipitation.

Enrichment of REEs from coal and coal byproducts have been reported previously. Products containing 1.8%, 0.5%, 0.7%, and 0.13% of total REEs have been reported by Honaker et al. (2017), Zhang et al. (2017), Zhang et al. (2018), and Lin et al. (2017), respectively, from coal-related sources using physical beneficiation methods. However, the generation of a REE pre-concentrate from a coal-based source using staged precipitation has not been previously reported.

Specific attention needs to be paid to scandium precipitation behavior due to its significantly higher market value relative to the other REEs. The maximum concentration of scandium occurred in the pH range 4.85 6.11 (Table 2), while the majority (37%) was recovered in the pH range 4.67 4.85 which is reflective of the higher weight percentage (FIG. 6 and Table 3). The proportions of scandium distributed in the lower pH ranges, i.e., 3.23 4.08, 4.08 4.55, 4.55 4.64 and 4.64 4.67 were higher than the other REEs.

Thorium content in the original leachate was low (0.5 ppm) and maximum recovery in the precipitates occurred in the lower pH range of 3.23 4.08. Only 10% of the thorium precipitated simultaneously with REEs in the pH range of 4.85 6.11. As such, thorium was less concentrated in the pre-concentrate compared with REEs. However, thorium existing in the pre-concentrate may be simultaneously enriched with the REEs in the downstream enrichment process, which may require attention in future studies.

Full elemental analyses of the precipitates were performed to evaluate the selectivity achieved as a function of contaminate cation content and the potential to recover valuable metals. As shown in Table 4, iron (Fe), aluminum (Al) and magnesium (Mg) were the major components in precipitates P1-P4, P5-P8 and P9-P12, respectively. The precipitate (P8), which has the highest REE content, contained 1.7% Zn, 1.4% Cu, 0.5% Ni and 0.2% Co while precipitate (P9) had 1.5% Ni, 1.3% Zn, 0.5% Co and 0.3% Cu. The above concentrations were close to and/or higher than the grades of typical economical ore deposits.

Therefore, a multi-element recovery scheme may be achievable to enhance the economic value associated with the natural leachate.

Titration of the natural leachate with a strong base such as sodium hydroxide contributed to the understanding of the buffering reactions in the aqueous system (Totsche et al., 2003; España et al., 2006).

Figure 7:
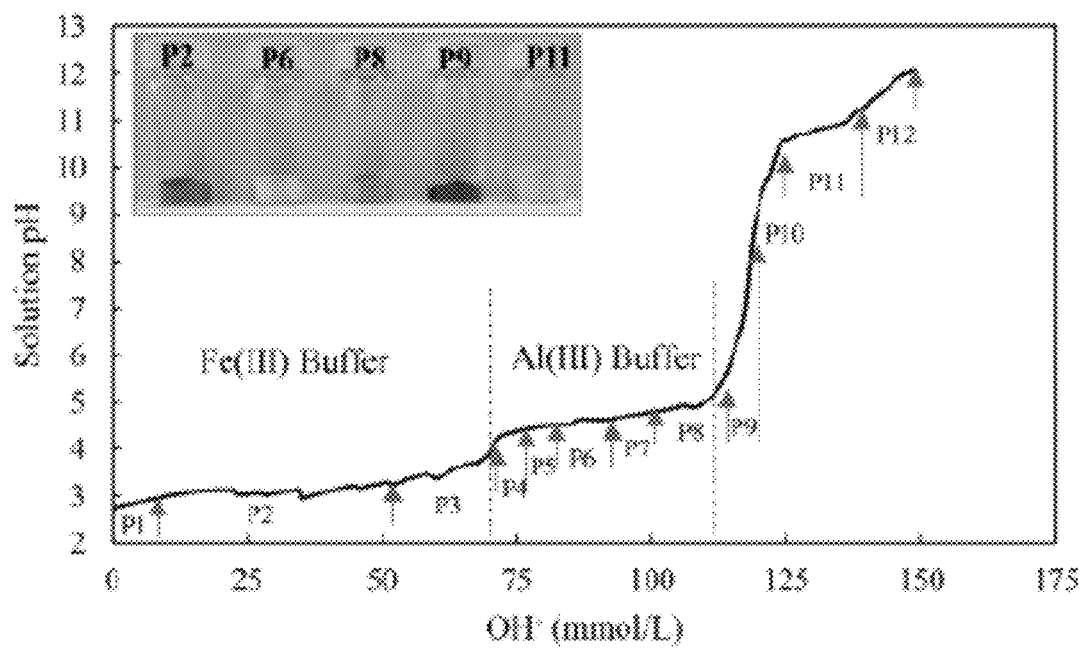
FIG. 7 shows Solution pH changes of the natural leachate as a function of the amount of sodium hydroxide added and appearance of the precipitates obtained from the staged precipitation test.

During the staged precipitation tests, the amount of sodium hydroxide added and the corresponding solution pH were recorded, which was used to draw a curve similar to a titration curve. Based on the curve (FIG. 7) and the precipitate compositions (Table 4), it was found that two distinct buffers (i.e., Fe and Al buffering) played significant functions in solutions having a pH<4.0 and between 4.0 and 6.0, respectively, corresponding to the two plateaus on the titration curve. The colors of the precipitates shown in FIG. 7 agree with the elemental compositions. The light brown color of precipitate P8, which contained the highest amount of REEs, falls in between P6 and P8, which is due to the enrichment of Al in precipitate P6 and Ni, Mn, and Cu in P9. Aluminum oxides normally appear white while oxides of the other three metals have a dark color.

3.3. Solution Chemistry Study

Solution equilibrium calculations were conducted in the study using the Visual MINTEQ software to predict precipitation behaviors of REEs and other valuable elements between the leachate and precipitates. In addition to equilibrium concentrations and activities of various species in solution, the Visual MINTEQ also calculated saturation indexes (SI) to determine whether precipitates are thermodynamically favored to precipitate or dissolve in solution. The saturation index can be represented by the following expression:

$$SI = \log IAP - \log K_{ap}$$

where IAP and K represent the ion activity product and solubility product, respectively. IAP equals [A] [B] for a precipitate with A B formula. SI>0 means the solution is oversaturated and precipitation is likely to occur, while precipitates do not form when SI<0. Concentrations of detectable cations and ions (Table 5) in the leachate measured using ICP-OES and IC were utilized as input information for solution chemistry modelling at pH 2.70. As reported in the previous section, precipitates were formed as the pH value was increased which resulted in selective removal of various species from solution. As such, to accurately model the precipitation behavior of the REEs as a function of solution pH, the input information regarding the concentrations in solution of all species was modified based on the precipitate compositions listed in Tables 2 and 4.

Figure 8:
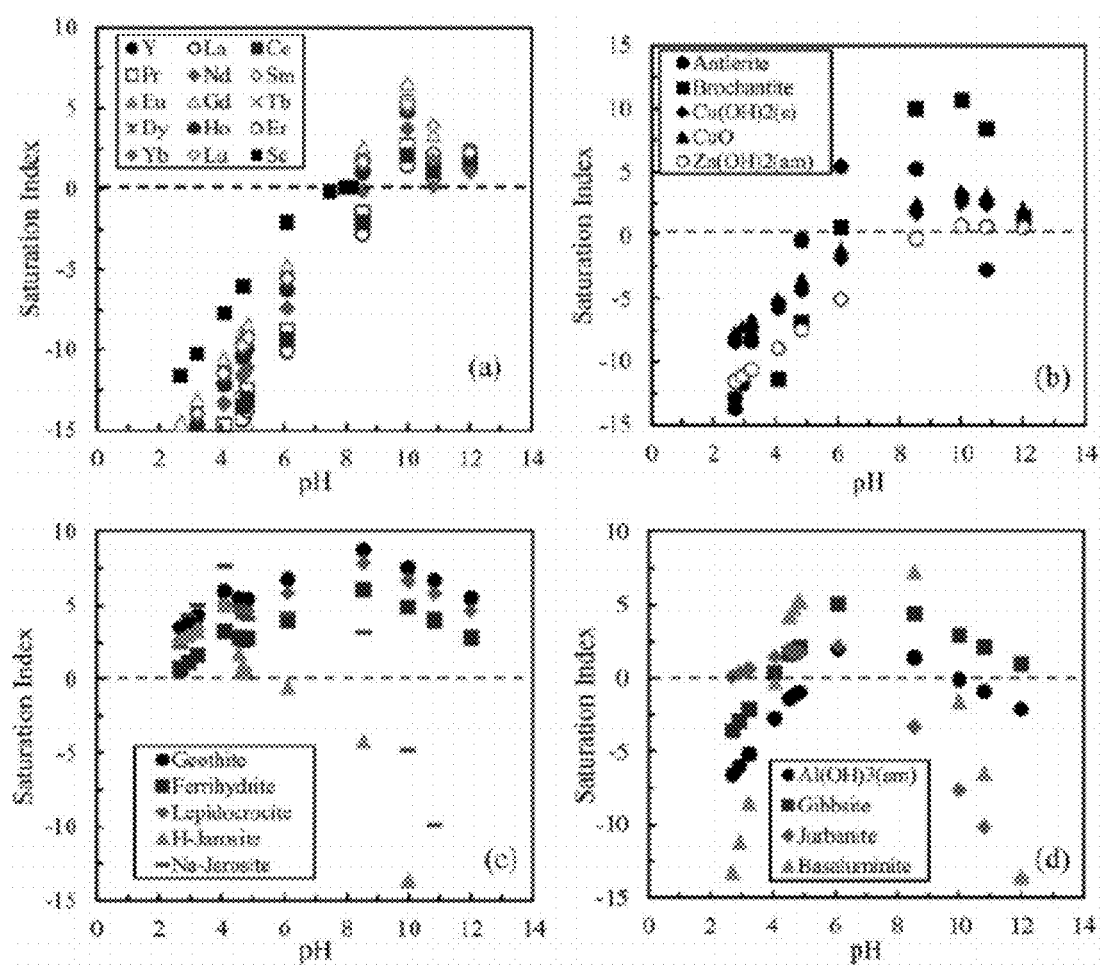
FIG. 8 shows Saturation indexes of the minerals possibly formed in the leachate at different pH values: (a) rare earth hydroxides (amorphous); (b) copper and zinc minerals; (c) iron and (d) aluminum minerals.

The saturation index (SI) values of rare earth hydroxides, copper, zinc, iron, and aluminum minerals in equilibrium with the solution under different pH conditions are shown in FIG. 8. The modelling results indicate that precipitation of the REEs is thermodynamically favorable in the pH range of 7.0 10.0 which is higher than the range (pH 4.85 6.11) observed in the staged precipitation tests (FIG. 8(a) and FIG. 6). Fractionation of REEs to solid phases in pH ranges close to the 4.85 6.11 has been reported previously (Sun et al., 2012; Verplanck et al., 2004; Bau, 1999). Bau (1999) found that REEs are likely to be fractioned to a solid phase in the pH range of 4.6 6.0 due to the formation of iron oxyhydroxide. Verplanck et al. (2004) oxidized six natural AMDs in laboratory experiments conducted under ambient conditions and found that REEs initiate partitioning to the solid phase at pH values>5.1 despite the fact that iron precipitation occurred below pH 5.1. Sun et al. (2012) performed adsorption experiments using acid mine drainage and reported that REEs can be adsorbed onto Mn secondary minerals formed in the solution in the pH range 4 6. As such, it was concluded that the effects of secondary minerals formed by the dominant species was the reason for the fractionation of REEs in the lower pH ranges. Based on previous research, the REE recovery with participates formed under acidic conditions may be caused by a combination of different factors: electrostatic attraction, surface precipitation and ternary complexes. Webster et al. (1998) reported that SO contributes to metal adsorption onto iron hydroxysulfate surfaces mainly through the formation of ternary complexes between the oxide surface, SO, and the metal ions.

The concentrations of each REE found in the precipitate products listed in the columns of Table 2 were correlated with the concentrations of each of the measured non-rare earth elements listed in Table 4 to determine an overall correlation coefficient. The objective was to quantify the relationship between each REE with the other elements during the staged precipitation process. The results listed in Table 6 indicated that REEs show a strong positive correlation with Zn, Cu and Si and a medium positive correlation with Al which is reflected by their respective high content values in the P8 precipitate product. In the pH range 4.85-6.11, aluminum hydroxides (e.g., gibbsite) and hydroxysulphates are likely to be the dominant species in the precipitate as indicated by elemental analyses (Table 4) and saturation indexes (FIG. 8(d)), which agrees with the findings of previous studies (España et al., 2006; Totsche et al., 2003). Adsorption of Cu on aluminum hydroxysulfate precipitates has also been reported (Ayora et al., 2016; Rothenhofer et al., 2000). However, in the current study, precipitation of copper is likely in the form of hydroxysulphates, i.e., antlerite (Cu (OH) SO) and brochantite (Cu (OH) SO), which occur in the pH range of 4.85-6.11 as indicated by the positive SI values (FIG. 8(b)).

Silicon in solution occurs largely as undissociated H SiO and is a polymeric colloid at concentrations above its solubility limit (Jenne, 1976). As such, precipitation of aluminum, copper and silica which occurred in the pH range of 4.85-6.11 explains the enrichment of the other metal ions such as Zn, Mn, and Co. The precipitates formed in an acid mine leachate were poorly crystalized, had very small particle sizes and extremely high specific surface area, which contributed to the adsorption of metal species (España et al., 2006; Webster et al., 1998). The adsorption of Zn is indirectly proven by the fact that precipitation of Zn is likely to occur at much higher pH values based on the solution chemistry modelling results (FIG. 8(b)). The effects of Mn on the fractionation of trace elements have been reported previously, while in the current study the correlation between Mn and REEs was negligible (Table 6). The function of Mn cannot be ignored given the fact that 1.14% of Mn existed in precipitate P8.

Figure 9:
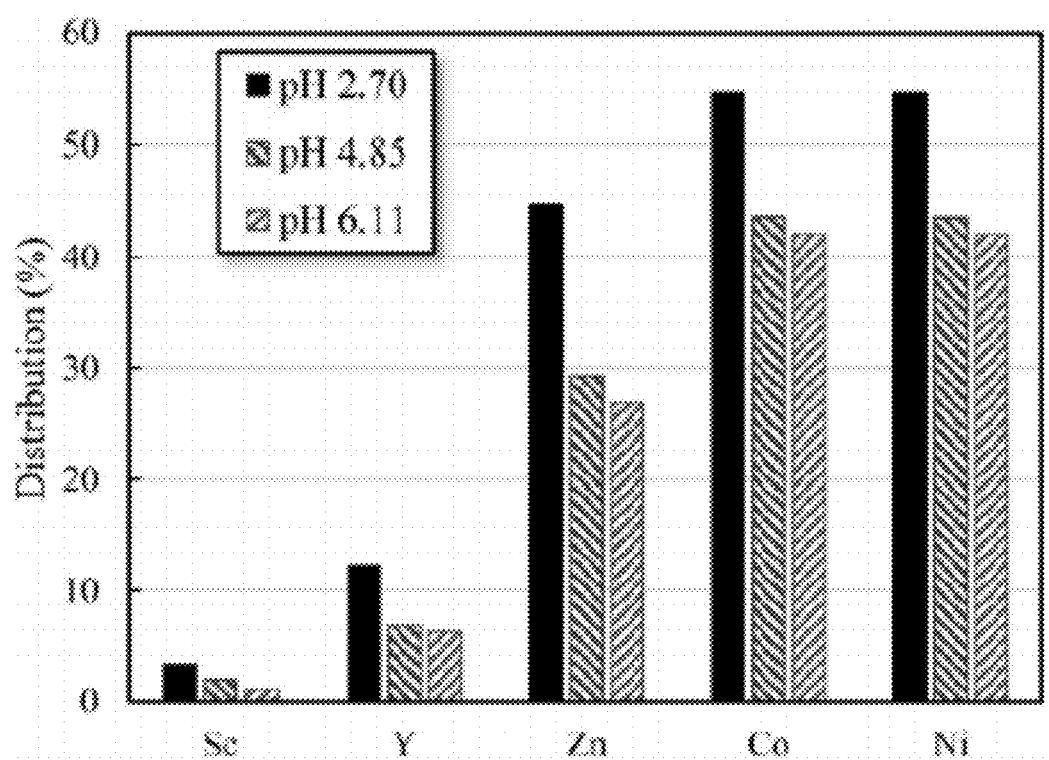
FIG. 9 shows Percentages of total metals in form of free ions in the solution (calculated using molar concentrations of different metal species).

Adsorption on the precipitate surfaces via either surface precipitation or ternary complexation is controlled by the stability of the complexes formed between the metal ions and SO, which can be investigated by the speciation distribution. Proportions of Sc, Y, Zn, Co and Ni that occurred as free species are listed in FIG. 9. Nearly 100% of the complexed species of the above elements occurred as sulfates. The preferential fractionation of Sc to the solid phase that occurred in the lower pH ranges may be explained by that fact that Sc is more likely combined with sulfate anions. The highest concentrations of Co and Ni occurred in the higher pH range 6.11-8.55 instead of 4.85-6.11, which can also be attributed to the fact that (i) the two elements have lower affinity for SO and (ii) the fraction of sulfate complexes increases with an evaluation in the solution pH values. Ochreous oxide precipitates (i.e., poorly crystallized oxy hydroxyl sulfates of Fe) which typically comprise weakly crystallized goethite, jarosite, ferrite and schwertmannite were major components of the precipitates obtained at pH values<4.55 as indicated by the elemental composition (Table 4) and saturation index (FIG. 8(c)) (Jönsson et al., 2006; Verplanck et al., 2004). The current study indicates that the effects of iron precipitates on the fractionation of REEs were minor, which may be due to lower stability of the rare earth sulfate complexes at lower pH values and/or competitive adsorption between the REEs and the other species such as Al, As and Pb.

3.4. Model System Study

To investigate the interactions among Fe, Al, and La in solutions containing SO, sequential precipitation tests were performed on the three model liquid systems, i.e., Liquid 1 (1120 ppm Fe, 1920 ppm SO, 8 ppm La), Liquid 2 (540 ppm Al, 1920 ppm SO, 8 ppm La) and Liquid 3 (560 ppm Fe, 270 ppm Al, 1920 ppm SO, 8 ppm La). The Fe and Al ion concentrations were varied to keep the metal to SO ion concentration ratio constant.

Figure 10:
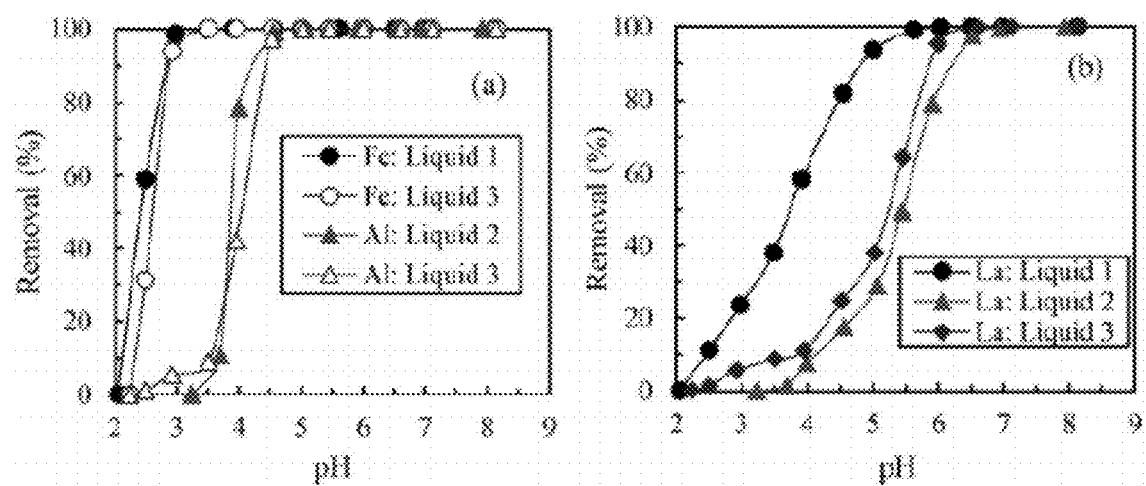
FIG. 10 shows Removal of iron, aluminum and lanthanum from the model solutions as a function of the solution pH values: (a) iron and aluminum; (b) lanthanum.

Percentage removal of the elements from the three liquids are shown in FIG. 10. >95% of the iron and aluminum were removed at pH values 3.0 and 4.5, respectively, for all three liquids. Removal of iron in liquid 3 was lower than liquid 1 for solution pH values<3.0, which may be explained by the lower iron concentration in liquid 3 (560 ppm vs 1120 ppm). However, aluminum removal in liquid 3 was higher than liquid 2 for pH values less than about 3.8 despite the fact that its concentration in liquid 3 was only half of liquid 2. In another word, precipitation of iron contributed to the fractionation of aluminum to the solid phase.

Unlike iron and aluminum, which were removed in narrow pH ranges of 2.0 to 3.0 and 3.5 to 4.5, respectively, the removal of lanthanum increased gradually as the solution pH value was elevated ((b)). As FIG. 10 such, instead of co-precipitation, lanthanum was removed from the liquids more likely through adsorption onto iron and aluminum hydroxides and/or hydroxysulfates surfaces, which agrees with the solution chemistry study of the real leachate. As shown in FIG. 10(b), the removal of lanthanum from the solution containing only Fe and SO (Liquid 1) at pH3.5 was around 40%. However, in Liquid 2 which contained Al and no Fe, there was no removal of lanthanum or aluminum at pH 3.5 indicating that no participation occurred in the system. When both Fe and Al were present in solution with SO and La, nearly 10% of the La ad Al was removed which was most likely due to competitive adsorption onto the iron hydroxysulphate precipitates. As the pH was increased above 3.5, both iron and aluminum hydroxysulphates precipitated which resulted in non-competitive adsorption of La onto the precipitate surfaces and 100% removal at a pH of around 6.5. The findings of the model system study provided an understanding for the selectivity achieved when treating the natural leachate, i.e., 1. The presence of aluminum sulfate limited the amount of rare earth elements that adsorbed onto the iron hydroxysulphate precipitate surfaces at pH values<4.85 and; 2. Both iron and aluminum hydroxysulphates precipitated at pH values<4.85 thereby eliminating nearly 100% of the iron and the majority of the aluminum.

3.5. Upgrading of the REE-Enriched Precipitate

The precipitate fractions enriched in REEs requires further upgrading to be commercially marketable as a mixed concentrate. Precipitate material identified as P8 and P9 in Table 3 were mixed together and re-dissolved using 10M HNO. The indissoluble material was removed using a 0.45 m pore size filter paper.>95% of REEs associated in the pre-concentrate (i.e., P8 and P9) were recovered into the solution. As shown in Table 7, the total REE content in solution was 52 ppm of which Y and Nd accounted for 50% of the total. Aluminum and magnesium were the primary contaminants.

After the dissolution step, oxalic acid was added to the pre-concentrate solution to selectively precipitation the REEs which resulted in the production of a high-grade mixed REE product. The oxalate precipitates were dried in an oven at 60° C. for 12 h and then roasted at 750° C. for 2 h. Under a given set of conditions (i.e., pH 1.20; aging time 30 min; oxalic acid dosage 0.02M), a final product containing 94% rare earth oxides (REO) was obtained with the REE distribution shown in Table 8. Approximately 30% of the mixed REO product was Nd O, Pr O, Dy O which are compounds commonly used in the manufacturing of permanent magnets. The overall REE recovery from the pre-concentrated solution was 78%. The final product contained about 0.5% Th and 0.2% U which is sufficiently high to require another process step. Several alternatives exist to reduce the concentration of the radioactive elements including caustic conversion, solvent extraction and ion adsorption technologies (Zhu et al., 2015).

3.6. Economic Assessment

A typical application of the staged precipitation process for REE recovery is the treatment of acidic water generated from the oxidation of pyrite at coal mining operations. For the source of the acidic water in this study, the volumetric flow rate of acidic water is approximately 500 m/h which contains 6.14 ppm of total REEs on a weight basis.

Assuming that a REE recovery plant would operate 24 h/day and 365 days annually due to the continuous flow, the annual production of mixed REE concentrate would be approximately 27 t using a recovery factor of 80% based on experimental results. For a typical 10-year life for the equipment utilized in the recovery process, the total amount of mixed REE concentrate generated by a selective precipitation plant would be around 270 t.

The economic value of the mixed REE concentrate produced from treating a natural leachate is difficult to assess due to the volatility of the market values and the associated costs of the downstream process needed to produce individual rare earth concentrates. However, Seredin and Dai (2012) introduced an expression that quantifies an outlook coefficient (C) based on the total percent content of critical rare earth elements in a given material relative to the total REE content (REY), i.e.:

$$REY_{def,rel} = 100\% \ x \frac{Nd + Eu + Tb + Dy + Y}{\sum REY_i} C_{outl} =$$

$$\left((Nd + Eu + Tb + Dy + Y)/\sum REY\right)/\left((Ce + Ho + Tm + Yb + Lu)/\sum REY\right)$$

The outlook coefficient value of 3.85 for the natural leachate source used in this study compares favorably with well-known REE mines extracting monazite and bastnaesite as shown in Table 9. The value of the natural leachate is realized by the amount of neodymium and dysprosium which represent nearly 20% of the total REE content. In addition, nearly 9% of the total REE content is scandium which has the highest market value of all the REEs. The xenotime sources listed in Table 9 have higher outlook coefficient values due to elevated yttrium contents.

The cost of the selective precipitation process when treating the natural leachate is significantly enhanced by the fact that treatment of the acidic water source is mandated by regulatory agencies. A review by Johnson and Hallberg (2005) states that chemical treatment using an alkaline solution is the most commonly used technique for water treatment at a mine site. As such, the chemical cost of elevating the solution pH value through the stage precipitation process does not need to be included in the overall cost. The chemical costs that are required include nitric acid to re-dissolve the REE pre-concentrate (precipitates) back into solution (10 t/m of leachate) and oxalic acid needed to selectively precipitate the REEs from the final leachate (10 t/m of leachate). Additional chemicals will be needed to address environmental issues such as thorium and uranium.

A preliminary cost assessment was conducted based on the treatment of 500 m/h of natural leachate using the project cost estimation guidelines described by Mular (2002). The project cost sheet presented in Table 10 includes the capital cost for equipment that essentially consists of a series of tanks and thickeners needed to achieve the necessary feed conditioning, pH adjustment and precipitate concentration.

Total equipment cost is multiplied by a series of factors to estimate the costs of ancillary items. Indirect costs are expressed as a percentage of the total indirect costs. The manpower cost is based on one supervisor and one individual operating the system each shift. The plant will operate 3 shifts daily and 365 days annually. The total capital and operating cost needed to recover 270 t of mixed REE concentrate over a 10-year period was estimated to be around $9.2 million. As such, the effective cost of producing 1 kg of mixed concentrate from the given source using the process described in this publication is approximately $33.9.

4. CONCLUSIONS

Staged precipitation tests were conducted in the current study for a natural leachate collected from a coal coarse refuse pile. The natural leachate contained 6.14 ppm of total REEs due to dissolution of the solid waste material by the acid generated from pyrite oxidization. A precipitate containing 1.1% total REEs, of which 64% are considered critical REEs, was obtained from the leachate in the pH range of 4.85-6.11. The precipitate also contained 18.4% Al, 1.7% Zn, 1.4% Cu, 1.14% Mn, 0.5% Ni and 0.2% Co, indicating the potential of additional added value from metals other than REEs. A mixed product containing 94% rare earth oxides was obtained by dissolution of the precipitates enriched in REEs followed by selective precipitation using oxalic acid. The final product content was especially high in yttrium, neodymium, samarium, gadolinium, and dysprosium oxide indicating the potential for significant economic value.

Precipitation characteristics of the REEs and other metal ions were investigated through solution chemistry calculations and modelling. The solution chemistry study indicated that enrichment of REEs and the other valuable elements in the precipitates was due to the adsorption effects of hydroxides and hydroxysulfates of Al, Si and Cu. The sequential precipitation tests performed on model systems indicated that competitive adsorption on the iron precipitate surfaces existed between Al and the REEs, which explained the selectivity realized in the staged precipitation process when treating the natural leachate.

We claim:

1. A method for concentrating rare earth materials from a feed stock, the method comprising:
   a) mixing the feed stock with an acid in a solution;
   b) increasing the pH of the solution incrementally to precipitate contaminants and removing the precipitated contaminants from the solution;
   c) further increasing the pH incrementally to precipitate rare earth metals and separating the precipitated rare earth metals from a resulting filtrate;
   d) re-dissolving the precipitated rare earth metals in a smaller volume of the filtrate; and
   e) transferring the re-dissolved filtrate to an acid solution.

2. The method of claim 1, including using a different acid to re-dissolve the rare earth metals in the filtrate than used when mixing the feed stock.

3. The method of claim 2, further including adding CaCl2), MgCl2 or CaCl2 and MgCl2 to the smaller volume of the filtrate prior to step e).

4. The method of claim 3, further including using a first class of acid to mix with the feedstock in the solution and using a second, different class of acid to re-dissolve the rare earth metal concentrate re-precipitate in the smaller volume of the filtrate.

5. The method of claim 4, including selectively precipitating the rare earth metals from the acid solution of step e).

6. The method of claim 5, including using oxalic acid to selectively precipitate the rare earth elements from the acid solution of step e).

7. The method of claim 1, including using oxalic acid to selectively precipitate the rare earth elements from the acid solution of step e).

8. The method of claim 1, wherein the rare earth materials include scandium.

9. A method for concentrating rare earth materials from a feed stock, the method comprising:
   a) mixing the feed stock with an acid in a solution;
   b) precipitating contaminants and removing the precipitated contaminants from the solution;
   c) subsequently precipitating rare earth metals from the solution and separating the precipitated rare earth metals from a resulting filtrate;
   d) re-dissolving the precipitated rare earth metals in a smaller volume of the filtrate; and
   e) transferring the re-dissolved filtrate to an acid solution.

10. The method of claim 9, including using a different acid to re-dissolve the rare earth metals in the filtrate than used when mixing the feed stock.

11. The method of claim 10, further including adding CaCl2, MgCl2 or CaCl2 and MgCl2 to the smaller volume of the filtrate prior to step e).

12. The method of claim 11, further including using a first class of acid to mix with the feedstock in the solution and using a second, different class of acid to re-dissolve the rare earth metal concentrate re-precipitate in the smaller volume of the filtrate.

13. The method of claim 12, including selectively precipitating the rare earth metals from the acid solution of step e).

14. The method of claim 13, including using oxalic acid to selectively precipitate the rare earth elements from the acid solution of step e).

15. The method of claim 9, including using oxalic acid to selectively precipitate the rare earth elements from the acid solution of step e).

16. The method of claim 9 wherein the rare earth elements include scandium.

17. A method for concentrating rare earth elements, comprising:
 a) mixing a feed material comprising a coal leachate and/or precipitate obtained therefrom with an acidic solution in a pH of 2.70±0.5;
 b) increasing the pH incrementally to 3.2±0.5, then 3.8±0.5 to precipitate iron when $Fe^{3+}$ is dominant;
 c) adding hydrogen peroxide to completely or partially transform $Fe^{2+}$ to $Fe^{3+}$ prior to step (b) when $Fe^{2+}$ is dominant iron species in solution;
 d) filtering iron from b);
 e) increasing the pH incrementally to 4.8±0.5 to precipitate aluminum;
 f) filtering aluminum from e);
 g) increasing the pH incrementally to 8.5±0.5 to precipitate rare earth elements; and
 h) filtering the rare earth elements to obtain a sequential rare earth precipitate and retaining the subsequent filtrate.

18. The method of claim 17, further comprising:
 i) dissolving the rare earth element precipitate back into the filtrate by lowering the pH to 2±0.5 and filtering out any precipitates;
 j) optionally adding calcium chloride and/or magnesium chloride;
 k) incrementally raising the pH to 4±0.5 and removing further precipitates;
 l) incrementally raising the pH to 9±0.5 to precipitate rare earth elements;
 m) filtering the rare earth element re-precipitate and retaining the filtrate.

19. The method of claim 18, further comprising:
 n) re-dissolving the re-precipitate of l) in the filtrate of l) by lowering the pH to 1.2±0.5;
 o) mixing the solution of m) with oxalic acid;
 p) incrementally increasing the pH back to 1.2±0.5;
 q) optionally stirring the solution of p) for a period of at least 20 minutes; and
 r) separating precipitated rare earth elements from the solution.

20. The method of claim 18, further comprising:
 s) re-dissolving the sequential precipitate of g) in the filtrate of g) by lowering the pH to 1.2±0.5;
 t) mixing the solution of m) with oxalic acid;
 u) incrementally increasing the pH back to 1.2±0.5;
 v) optionally stirring the solution of j) for a period of at least 20 minutes; and
 w) separating precipitated rare earth elements from the solution.

* * * * *